United States Patent [19]
Jibbe et al.

[11] Patent Number: 5,375,217
[45] Date of Patent: Dec. 20, 1994

[54] METHOD AND APPARATUS FOR SYNCHRONIZING DISK DRIVE REQUESTS WITHIN A DISK ARRAY

[75] Inventors: Mahmoud K. Jibbe; Craig C. McCombs, both of Wichita, Kans.

[73] Assignee: NCR Corporation, Dayton, Ohio

[21] Appl. No.: 857,539

[22] Filed: Mar. 25, 1992

[51] Int. Cl.⁵ ............................................. G06F 13/00
[52] U.S. Cl. .................................................... 395/425
[58] Field of Search .......................................... 395/425

[56] References Cited

U.S. PATENT DOCUMENTS

| | | | |
|---|---|---|---|
| 4,232,366 | 11/1980 | Levy et al. | 395/325 |
| 4,293,908 | 10/1981 | Bradley et al. | 395/275 |
| 4,423,448 | 12/1983 | Frandsen | 360/106 |
| 4,600,990 | 7/1986 | Gershenson et al. | 395/425 |
| 5,179,704 | 1/1993 | Jibbe et al. | 395/725 |

*Primary Examiner*—David L. Robertson
*Attorney, Agent, or Firm*—James M. Stover

[57] ABSTRACT

A simple method and circuit for qualifying and combining individual request signals received from a plurality of disk drives within a disk array to generate a single, synchronized request signal for the disk array. The circuit includes an activity register for storing a bit pattern which identifies those disk drives which are in use within the array. Each bit position within the activity corresponds to a different disk drive within the disk array. A logic one stored in a bit position identifies the disk drive corresponding to the bit position as being active while a logic zero stored in a bit position identifies the disk drive corresponding to the bit position as being inactive. The circuit further includes an OR gate associated with each disk drive within the disk array, each OR gate having a first input connected to receive the bit information corresponding to its associated disk drive from the activity register, and a second inverting input for receiving the individual request signal from its associated disk drive. The outputs of the OR gates are provided to an AND logic operator which combines the received signals to generate the request signal for the array. Additionally, the circuit includes a NAND gate associated with each disk drive within the disk array. Each NAND gate has a first input connected to receive the bit corresponding to its associated disk drive from the activity register, and a second input for receiving an acknowledge signal for the disk array. The NAND gates function to provide individual acknowledge signals to the active disk drives within the array.

12 Claims, 7 Drawing Sheets

METHOD AND APPARATUS FOR SYNCHRONIZING DISK DRIVE REQUESTS WITHIN A DISK ARRAY

The present invention relates to disk array storage devices for computer systems and, more particularly, to controllers for disk arrays.

BACKGROUND OF THE INVENTION

Disk arrays comprising a multiplicity of small inexpensive disk drives, such as the 5¼ or 3½ inch disk drives currently used in personal computers and workstations, connected in parallel have emerged as a low cost alternative to the use of single large disks for non-volatile storage of information within a computer system. The disk array appears as a single large fast disk to the host system but offers improvements in performance, reliability, power consumption and scalability over a single large magnetic disk. Several disk array alternatives are discussed in an article titled "A Case for Redundant Arrays of Inexpensive Disks (RAID)" by David A. Patterson, Garth Gibson and Randy H. Katz; University of California Report No. UCB/CSD 87/391, December 1987. The article, incorporated herein by reference, discusses disk arrays and the improvements in performance, reliability, power consumption and scalability that disk arrays provide in comparison to single large magnetic disks.

In order to coordinate the operation of the multitude of disk drives within the array to perform read and write functions, parity generation and checking, and data restoration and reconstruction, complex storage management techniques are required. In many of the disk array systems described in the prior art, the host operates as the array controller and performs the parity generation and checking and other storage management operations. Many current disk array systems employ a separate I/O controller associated with the array for controlling the operations listed above, thus removing array operation overhead from the host processor.

In a disk array system employing an array controller, the controller can be designed to operate all or a subset of all the drives within the array as a single logical unit, depending upon the configuration selected for the array; the drives within the logical unit functioning as a single drive. Such an arrangement requires that all the drives within the logical unit provide a single synchronous response to the host controller, allowing the several drives within the logical unit to operate their spindles at the same synchronous rotational rate. This synchronous operation is not supported by many disk drive and disk array vendors. In addition, many available array controllers require a buffer for each drive channel to store data during transmission.

OBJECTS OF THE INVENTION

It is therefore an object of the present invention to provide a new and useful method for synchronizing the requests of a plurality of disk drives within an array.

It is another object of the present invention to provide a new and useful apparatus for combining a plurality of individual request signals received from the individual channels within the disk array into a single request signal for the array.

It is yet another object of the present invention to provide such an apparatus which can be configured to combine selected channel request signals into a single request signal.

It is still a further object of the present invention to provide a simple, low cost method and apparatus for synchronizing and qualifying a plurality of individual disk array channel request signals into a single request signal for the array.

It is also an object of the present invention to provide such a method and apparatus which eliminates the need for a buffer on each channel to store data for transmission.

SUMMARY OF THE INVENTION

There is provided, in accordance with the present invention, a method and apparatus for generating a single request signal for a logical storage unit including all or a subset of all the disk drives within a disk array. The apparatus includes an activity register for storing a bit pattern which identifies those disk drives included within the logical storage unit, and logic connected to receive the bit pattern stored within the activity register and individual request signals from each disk drive within the disk array. The logic combines the individual request signals associated with the disk drives included within the logical storage unit, ignoring signals received from those drives not identified as included within the logical storage unit, to generate the single request signal for the logical storage unit.

In the described embodiment, the activity register is loaded with a bit pattern which includes a bit corresponding to each disk drive within the disk array. A logic one stored in a bit position identifies the disk drive corresponding to the bit position as being active, i.e., included within the logical storage unit. A logic zero stored in a bit position identifies the disk drive corresponding to the bit position as being inactive, i.e., not included within the logical storage unit.

The logic for combining the individual request signals comprises an OR gate associated with each disk drive within the disk array, each OR gate having a first input connected to receive the bit corresponding to its associated disk drive from the activity register, and a second inverting input for receiving the individual request signal from its associated disk drive. The outputs of the OR gates are provided to an AND logic operator which combines the received signals to generate the request signal for the logical unit.

Additionally, the apparatus includes a NAND gate associated with each disk drive within the disk array. Each NAND gate has a first input connected to receive the bit corresponding to its associated disk drive from the activity register, and a second input for receiving an acknowledge signal for the logical storage unit. The NAND gates function to provide individual acknowledge signals to the disk drives included within the logical storage unit.

The above and other objects, features, and advantages of the present invention will become apparent from the following description and the attached drawings.

DETAILED DESCRIPTION OF THE PREFERRED EMBODIMENT

Figure 1:
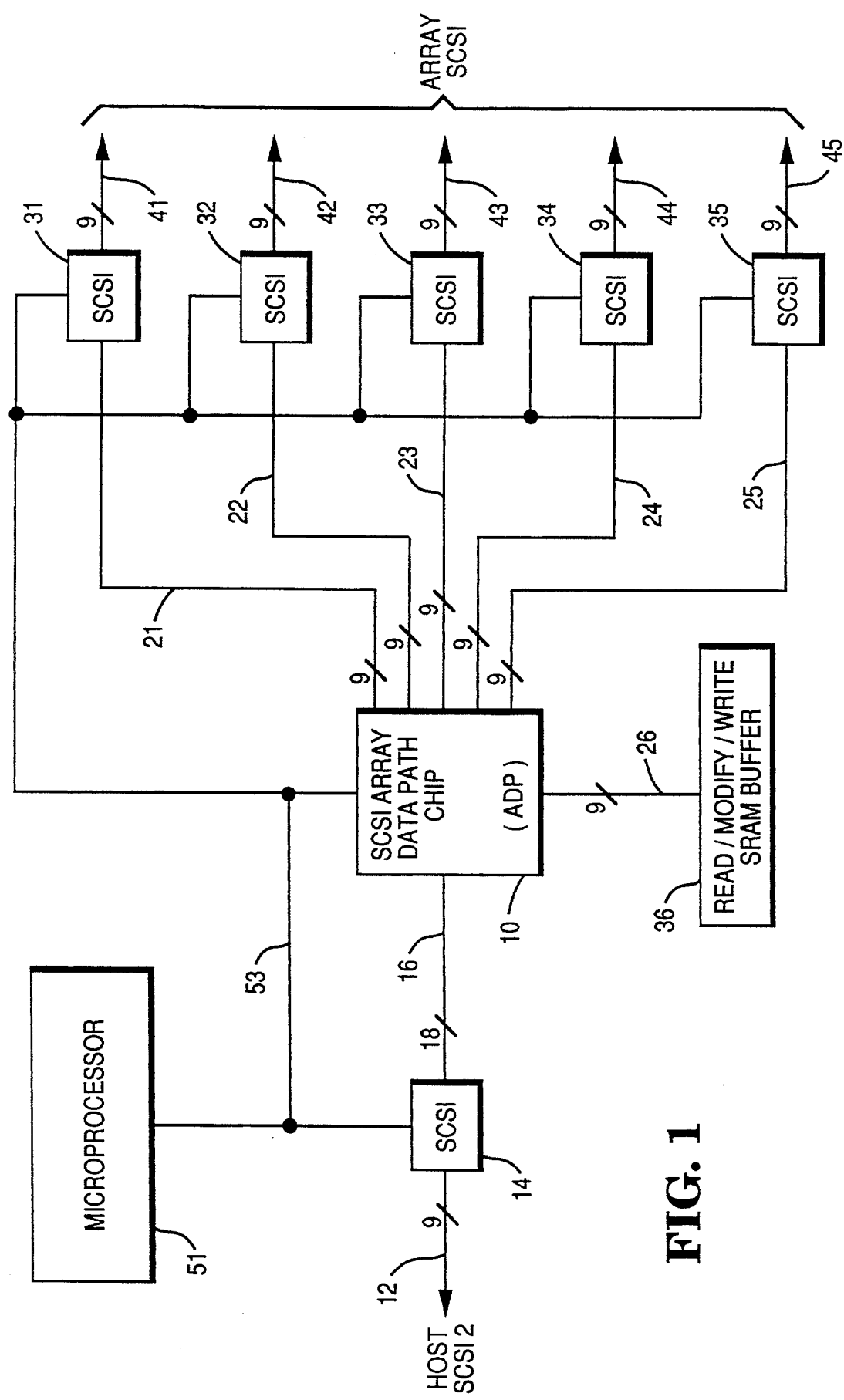
FIG. 1 is a block diagram of a disk array controller incorporating the lock-stepped array request circuitry of the present invention.

Referring now to FIG. 1, there is seen a block diagram of a SCSI (small computer system interface) disk array controller incorporating the lock-stepped array request circuitry of the present invention. The controller includes a host SCSI adapter 14 to interface between the host system SCSI data bus 12 and DMA data bus 16. Parity generation and data and parity routing are performed within SCSI Array Data Path Chip (ADP) 10. ADP chip 10 interconnects DMA data bus 16 with six additional data busses, identified by reference numerals 21 through 26. SCSI bus interface chips 31 through 35 interface between respective DMA data busses 21 through 25 and corresponding external disk drive SCSI data busses 41 through 45. Bus 26 connects ADP chip 10 with a static random access memory (SRAM) 36. ADP chip 10, SCSI adapter 14 and SCSI bus interface chips 31 through 35 all operate under the control of a dedicated microprocessor 51.

All data busses shown, with the exception of buses 12 and 16, include nine data lines, one of which is a parity bit line. Buses 12 and 16 include 16 data lines, two of which are bus parity lines. Additional control, acknowledge and message lines, not shown, are also included with the data busses.

SCSI adapter 14, SCSI bus interface chips 31 through 35, SRAM 36 and microprocessor 51 are commercially available items. For example, SCSI adapter 14 may be a NCR 59C916 chip, SCSI bus interface chips 31 through 35 may be NCR 53C96 chips and microprocessor 51 could be a Motorola MC68020, 25 megahertz microprocessor. Also residing on the microprocessor bus are a one megabyte DRAM, a 128 kilobyte EPROM, an eight kilobyte EEPROM, a 68901 multifunction peripheral controller, a SRAM address register and various other registers.

SCSI data path chip 10 is an application specific integrated circuit device capable of handling all data routing, data multiplexing and demultiplexing, and parity generation and checking aspects of RAID levels 1, 3 and 5. Custom redundant and non-redundant derivatives are also supported. ADP chip 10 handles the transfer of data between host SCSI adapter 14 and SCSI bus interface chips 31 through 35. The ADP chip also handles the movement of data to and from the SRAM during read/modify/write operations of RAID level 5.

Figure 2:
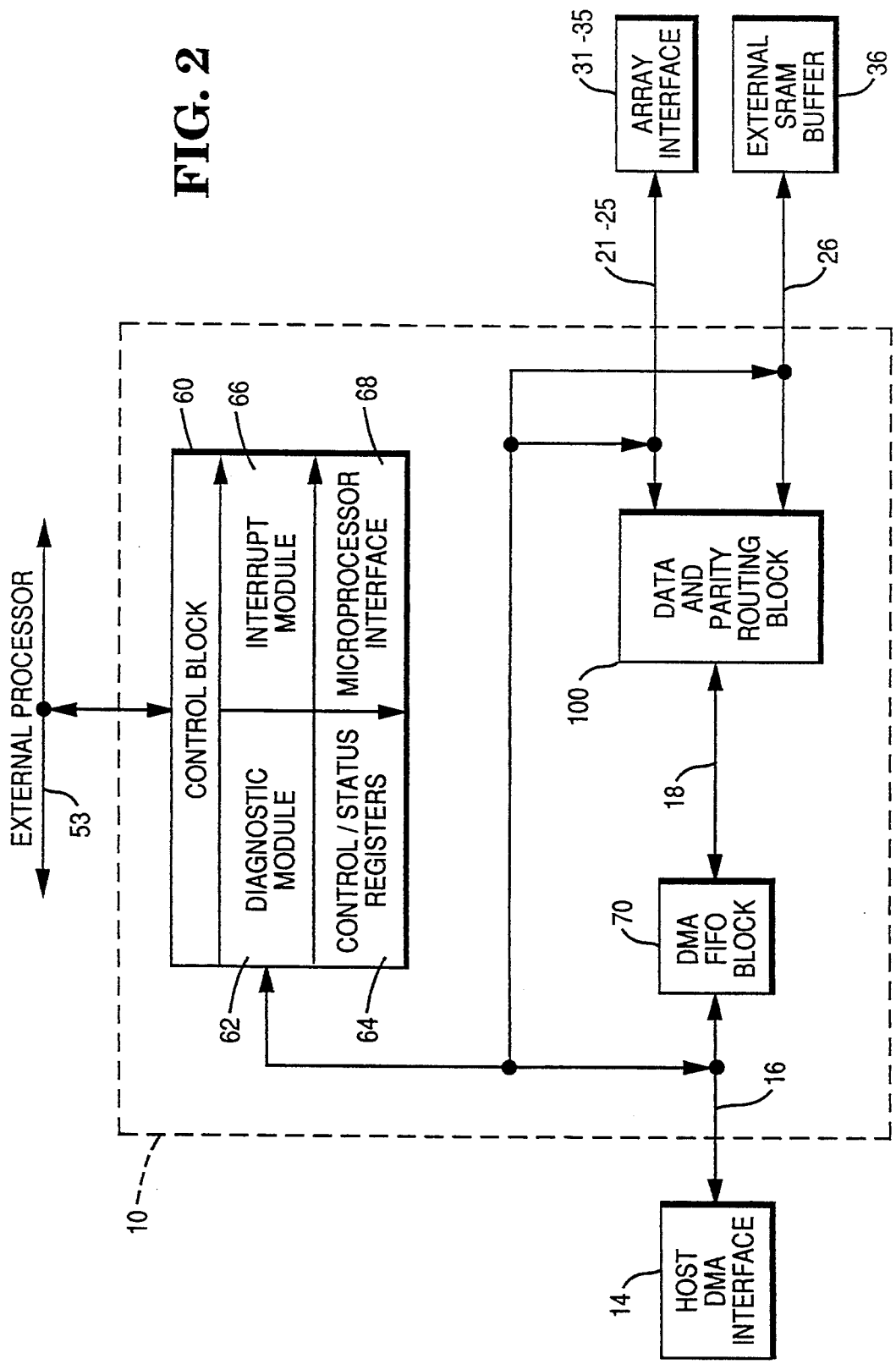
FIG. 2 is a functional block diagram of the SCSI Array Data Path Chip (ADP) shown in FIG. 1 which incorporates the lock-stepped array request circuitry of the present invention.

FIG. 2 is a functional block diagram of the SCSI Array Data Path Chip (ADP) shown in FIG. 1. The ADP chip consists of the following internal functional blocks: control logic block 60 including diagnostic module 62, configuration control and status register module 64, interrupt module 66 and interface module 68; DMA FIFO block 70; and data and parity routing block 100.

The main function of control block 60 is to configure or to test the data path and parity path. Microprocessor interface module 68 contains basic microprocessor read and write cycle control logic providing communication and data transfer between microprocessor 51 (shown in FIG. 1 ) and control and status registers within the control block. This interface utilizes a multiplexed address and data bus standard wherein microprocessor read and write cycles consist of an address phase followed by a data phase. During the address phase a specific register is selected by the microprocessor. During the following data phase, data is written to or read from the addressed register.

Configuration control and status register module 64 includes numerous eight-bit registers under the control of microprocessor interface module 68 as outlined above. The contents of the control registers determine the configuration of the data and parity paths. Status registers provide configuration and interrupt information to the microprocessor.

Diagnostic module 62 includes input and output control and data registers for the host and each array channel. The input registers are loaded by the processor and provide data to host bus 16, array busses 21 through 25 and SRAM bus 26 to emulate host or array transfers. The output registers, which are loaded with data routed through the various data buses, are read by the microprocessor to verify the proper operation of selected data and parity path configurations.

Interrupt module 66 contains the control logic necessary to implement masking and grouping of ADP chip and disk controller channel interrupt signals. Any combination of five channel interrupt signals received from SCSI bus interface chips 31 through 35 and three internally generated ADP parity error interrupt signals can be combined together to generate an interrupt signal to the microprocessor.

During write operations DMA FIFO block 70 holds data received from the host until the array is ready to accept the data and to convert the data from eighteen bit bus 16 to nine bit busses 18. During read operations DMA FIFO block 70 holds the data received from the disk array until the host system is ready to accept the data and converts the data from the nine-bit busses 18 to eighteen-bit bus 16.

Data and parity routing block 100 contains the steering logic for configuring the data and parity paths between the host, the disk array and SRAM 36 in response to control bytes placed into the control registers contained in module 64. Block 100 also includes logic for generating and checking parity, verifying data, broadcasting data, mirroring data, monitoring data transfers, and reconstructing data lost due to a single disk drive failure.

Figure 3:
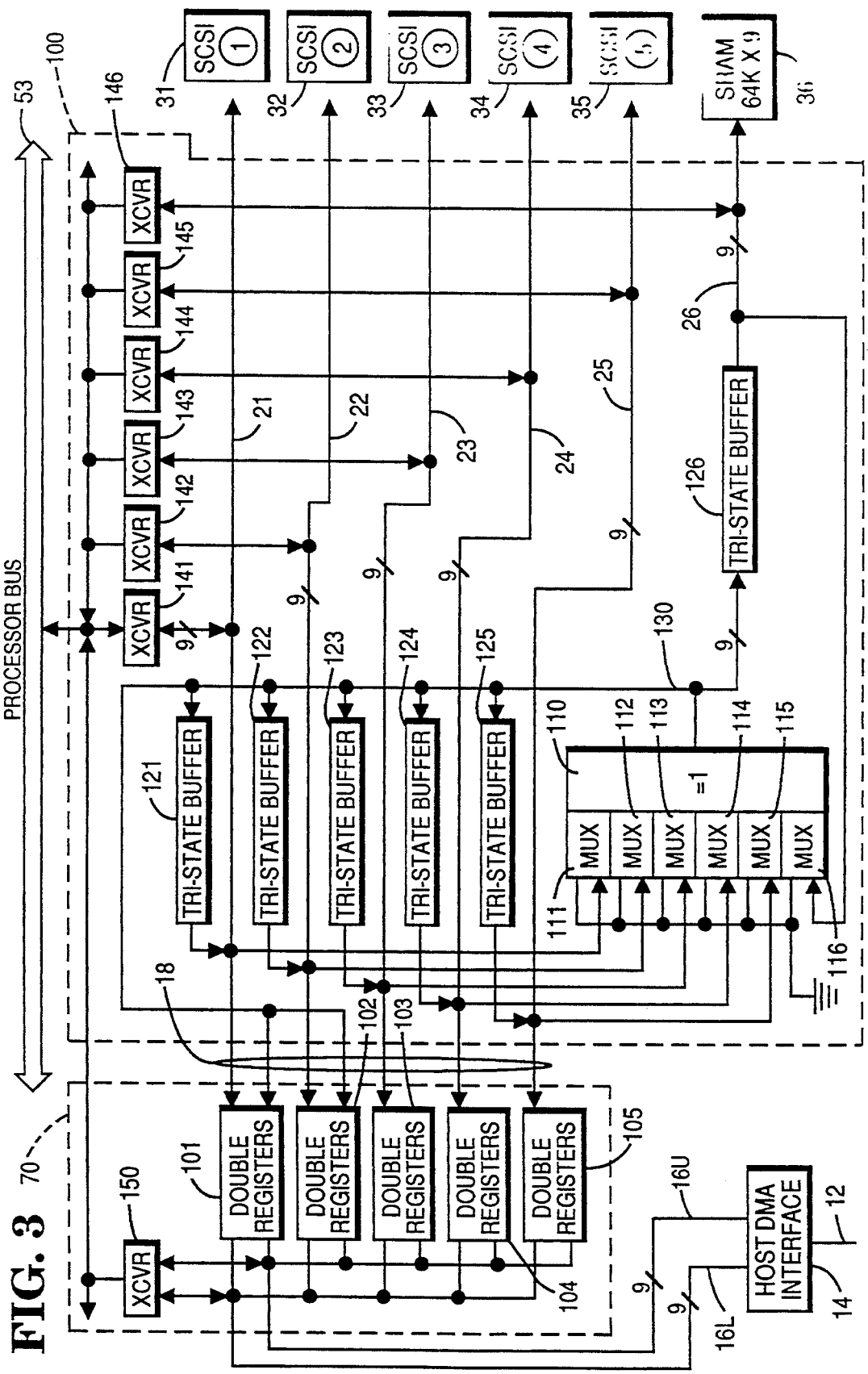
FIG. 3 is a block diagram of the DMA FIFO and routing blocks shown in FIG. 2.

FIG. 3 is a block diagram of DMA FIFO block 70 and routing block 100 shown in FIG. 2. The data routing architecture includes five data channels, each channel providing a data path between SCSI adapter 14 and corresponding SCSI bus interface chips 31 through 35. The first data channel includes a double register 101 connected between nine-bit host busses 16U and 16L and array bus 21. Busses 16U and 16L collectively transfer sixteen bits of data and two bits of parity information between external SCSI adapter 14 and double register 101. Array bus 21 connects double register 101 with SCSI bus interface chip 31. Additional taps to array bus 21 will be discussed below. Data channels two through five are similarly constructed, connecting host busses 16U and 16L through respective double registers 102 through 105 and array busses 22 through 25 with SCSI bus interface chips 32 through 35.

Each one of double registers 101 through 105 includes an internal two-to-one multiplexer for selecting as input either one of host busses 16U or 16L when data is to be transferred from busses 16U and 16L to the array busses. Double registers 101 and 102 also include an internal two-to-one multiplexer for selecting as input either the associated array bus or a parity bus 130 when data is to be transferred to host busses 16U and 16L.

An exclusive-OR circuit 110 is employed to generate parity information from data placed on array busses 21 through 25. A tap is provided between each one of array busses 21 through 25 and a first input of a respective two-to-one multiplexer, the output of which forms an input to exclusive-OR circuit 110. The second inputs of each one of the multiplexers, identified by reference numerals 111 through 115, are connected to ground.

The output of exclusive-OR circuit 110 is provided via nine-bit bus 130 to double registers 101 and 102 and tristate buffers 121, 122, 123, 124, 125 and 126. Tristate buffer 121, when enabled, provides the parity information generated by exclusive-OR circuit 110 to array buss 21. Likewise, tristate buffers 122 through 126 route parity information from bus 130 to array busses 22 through 26, respectively. Bus 26 connects the output of tristate buffer 126 with SRAM 36 and one input of a two-to-one multiplexer 116. The output of multiplexer 116 is input to exclusive-OR circuit 110 to provide the architecture with parity checking and data reconstruction capabilities, to be discussed in greater detail below.

Also shown in FIG. 3 are six transceivers, identified by reference numerals 141 through 146, for connecting respective busses 21 through 26 with processor bus 53 for transferring diagnostic information between the array channels and the processor. An additional transceiver 150 connects host busses 16U and 16L with processor bus 53. Transceivers 141 through 146 and 150 allow diagnostic operations by the controller processor.

Control lines, not shown, are provided between control registers residing in configuration control and status module 64, discussed above with reference to FIG. 2, and double registers 101 through 105, multiplexers 111 through 116, tri-state buffers 121 through 126, and transceivers 141 through 146 and 150. Five data path control registers are responsible for configuration of the data path. Data Path Control Register 1 controls data flow through double registers 101 through 105 during array write operations. Each control register bit controls the operation of one of registers 101 through 105 as identified below.

TABLE 1

| Data Path Control Register 1 | |
| --- | --- |
| Bit 0 | enables register 101 |
| Bit 1 | enables register 102 |
| Bit 2 | enables register 103 |
| Bit 3 | enables register 104 |
| Bit 4 | enables register 105 |
| Bit 5 | not used |
| Bit 6 | not used |

TABLE 1-continued

| Data Path Control Register 1 | |
| --- | --- |
| Bit 7 | not used |

When any one of control bits 1 through 5 are set high, data obtained from the host is transferred onto the internal array bus corresponding to the enabled register. The data obtained from the host is thereafter available to the SCSI bus interface chip connected to the array bus, the parity generating logic and to the diagnostic circuitry.

Data Path Control Register 2 controls the operation of multiplexers 111 through 116, thereby governing the input to exclusive-OR circuit 110. Each register bit controls the operation of one of multiplexers 111 through 116 as identified below.

TABLE 2

| Data Path Control Register 2 | |
| --- | --- |
| Bit 0 | selects input to MUX 111 |
| Bit 1 | selects input to MUX 112 |
| Bit 2 | selects input to MUX 113 |
| Bit 3 | selects input to MUX 114 |
| Bit 4 | selects input to MUX 115 |
| Bit 5 | selects input to MUX 116 |
| Bit 6 | not used |
| Bit 7 | not used |

In the table above, a logic one stored in one or more of register bits 0 through 5 sets the corresponding multiplexer to provide data from its associated array bus to exclusive-OR circuit 110. A logic zero stored in one or more of register bits 0 through 5 selects the corresponding multiplexer input connected to ground.

Data path control register 3 enables and disables the flow of data to or from SCSI bus interface chips 31 through 35 and SRAM 36. The functions of the individual register bits are described below.

TABLE 3

| Data Path Control Register 3 | |
| --- | --- |
| Bit 0 | enable SCSI DMA I/O on channel 1 |
| Bit 1 | enable SCSI DMA I/O on channel 2 |
| Bit 2 | enable SCSI DMA I/O on channel 3 |
| Bit 3 | enable SCSI DMA I/O on channel 4 |
| Bit 4 | enable SCSI DMA I/O on channel 5 |
| Bit 5 | enable data I/O with SRAM |
| Bit 6 | not used |
| Bit 7 | not used |

A logic one stored in any one of bits 0 through 5 enables the corresponding channel. Data flow direction to or from SCSI bus interface chips 31 through 35 and SRAM 36 is determined by data path control register 5.

Data path control register 4, through associated chip hardware, enable specific RAID operations as described below.

TABLE 4

| Data Path Control Register 4 | |
| --- | --- |
| Bit 0 | array data transfer direction |
| Bit 1 | RAID level 1 enable |
| Bit 2 | RAID level 4 or 5 enable |
| Bit 3 | RAID level 3 enable |
| Bit 4 | drive configuration 2+1 enable |
| Bit 5 | drive configuration 4+1 enable |
| Bit 6 | array parity checking enable |
| Bit 7 | not used |

The direction of data flow through the register banks 101 through 105 is determined from the setting of bit 0.

This bit is set high for host to array write operations and set low for array to host read operations. Bits 1, 2 and 3 enable the specific RAID operations when set high. Bits 4 and 5 enable the specific RAID level 3 operations when set high. Control bit 6 is set high to enable RAID parity checking.

Data path control register 5 controls the data flow direction to or from SCSI bus interface chips 31 through 35 and SRAM 36.

TABLE 5

Data Path Control Register 5

| Bit 0 | array direction channel 1 |
|---|---|
| Bit 1 | array direction channel 2 |
| Bit 2 | array direction channel 3 |
| Bit 3 | array direction channel 4 |
| Bit 4 | array direction channel 5 |
| Bit 5 | external SRAM direction |
| Bit 6 | not used |
| Bit 7 | not used |

A logic one stored in any one of register bits 0 through 5 specifies that data is to transferred from the array channel bus to its connected SCSI bus interface chip or SRAM. A logic 0 sets the data transfer direction from the SCSI bus interface chip or SRAM to the corresponding array channel bus. The control bits of register 3 must be set to enable SCSI bus interface chips 31 through 35 and SRAM 36 to perform a data transfer operation.

The five data path control registers discussed above enable or disable double registers 101 through 105, multiplexers 111 through 116, tri-state buffers 121 through 126, and transceivers 141 through 146 and 150 to configure the architecture to perform RAID level 1, 3, 4 and 5 read and write operations.

Figure 4:
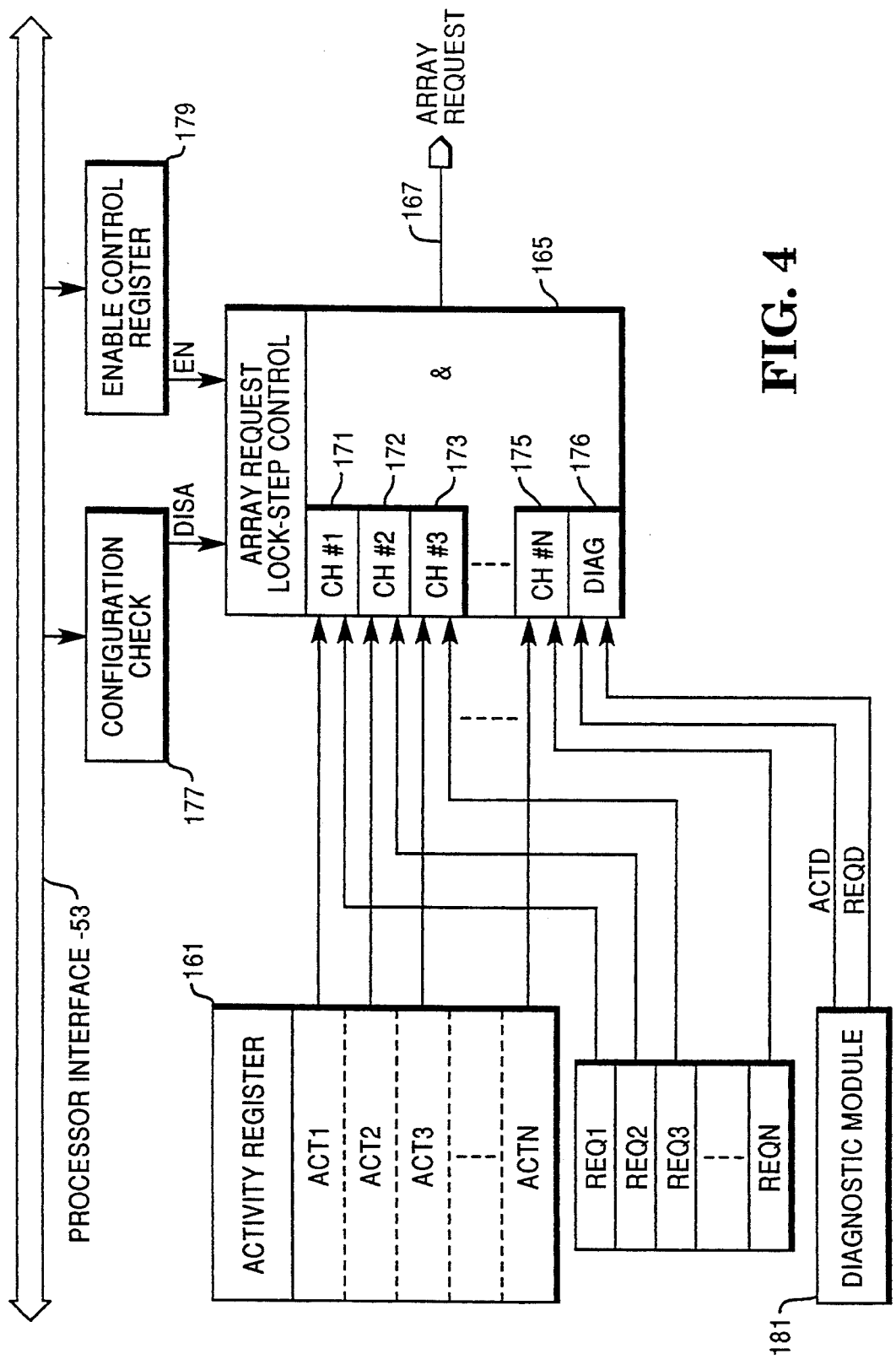
FIG. 4 is a functional block diagram of a circuit for qualifying and grouping multiple disk request signals into a single array request signal in accordance with the present invention.
Figure 6:
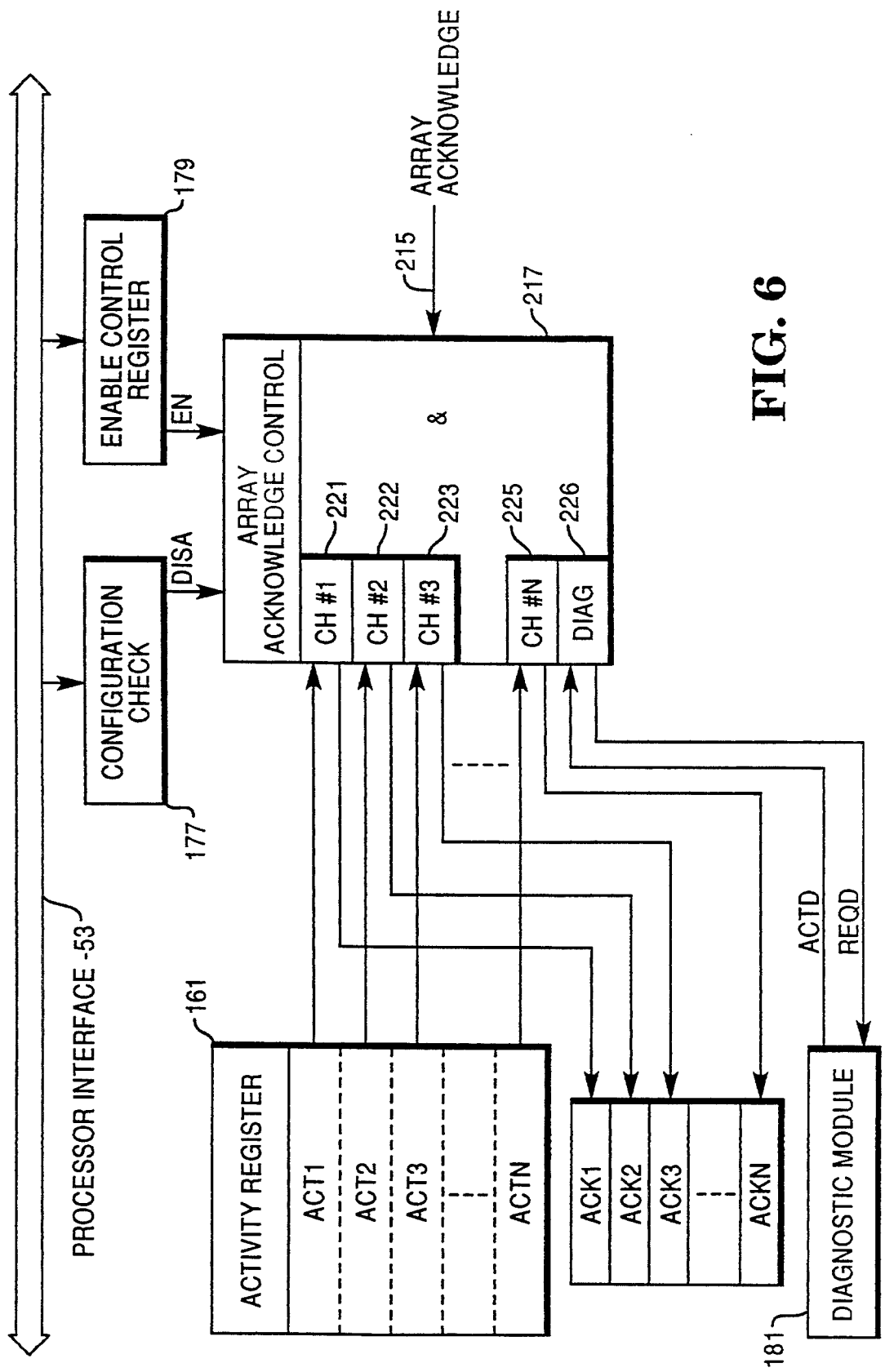
FIG. 6 is a functional block diagram of a circuit for generating and qualifying disk acknowledge signals from a single array acknowledge signal in accordance with the present invention.

The present invention is embodied in logic contained within control block 60 of ADP chip 10, shown in FIG. 2. A functional block diagram of the logic for qualifying and grouping multiple disk request signals into a single array request signal in accordance with the present invention is shown in FIG. 4. A functional block diagram of the logic for generating and qualifying disk acknowledge signals from a single array acknowledge signal in accordance with the present invention is shown in FIG. 6.

Referring now to the block diagram of FIG. 4, the logic for generating a single request signal for the array includes an activity register 161 and an array request lock-step control block 165. During configuration of the array data paths by ADP chip 10, the activity register is loaded with a bit pattern which identifies the active array channels, e.g., a logic one stored in any one of bits 0 through 4 indicates that the corresponding one of channels 1 through 5 is active. A logic zero in any bit position indicates that the channel associated with the position is inactive. The bit values loaded into activity register 161 correspond to the bit values loaded into data path control register 3 discussed earlier. Within activity register 161 the individual bits are labeled ACT1, ACT2, ACT3 through ACTN.

Signals ACT1, ACT2, ACT3 through ACTN from activity register 161 are paired with the request signals received from the individual disk drives within the array, identified as REQ1, REQ2, REQ3 through REQN, and provided to array request lock-step control block 165. Within control block 165 the individual drive request signals are qualified and combined to generate a single array request signal for the array. This signal is provided on line 167. A schematic diagram of circuitry included within array request lock-step control block 165 for combining five individual request signals is provided in FIG. 5, which will be discussed below.

The logic shown in FIG. 4 also includes a configuration check circuit 177, an enable control register 179 and a diagnostic module 181. Configuration check circuit 177 detects configuration violations which can prohibit valid data transfers. Enable control register 179 is loaded by the processor at the conclusion of data path configuration to enable control block 165. Configuration check circuit 177, enable control register 179 and a diagnostic module 181 each provide output to lock-step control block 165.

Figure 5:
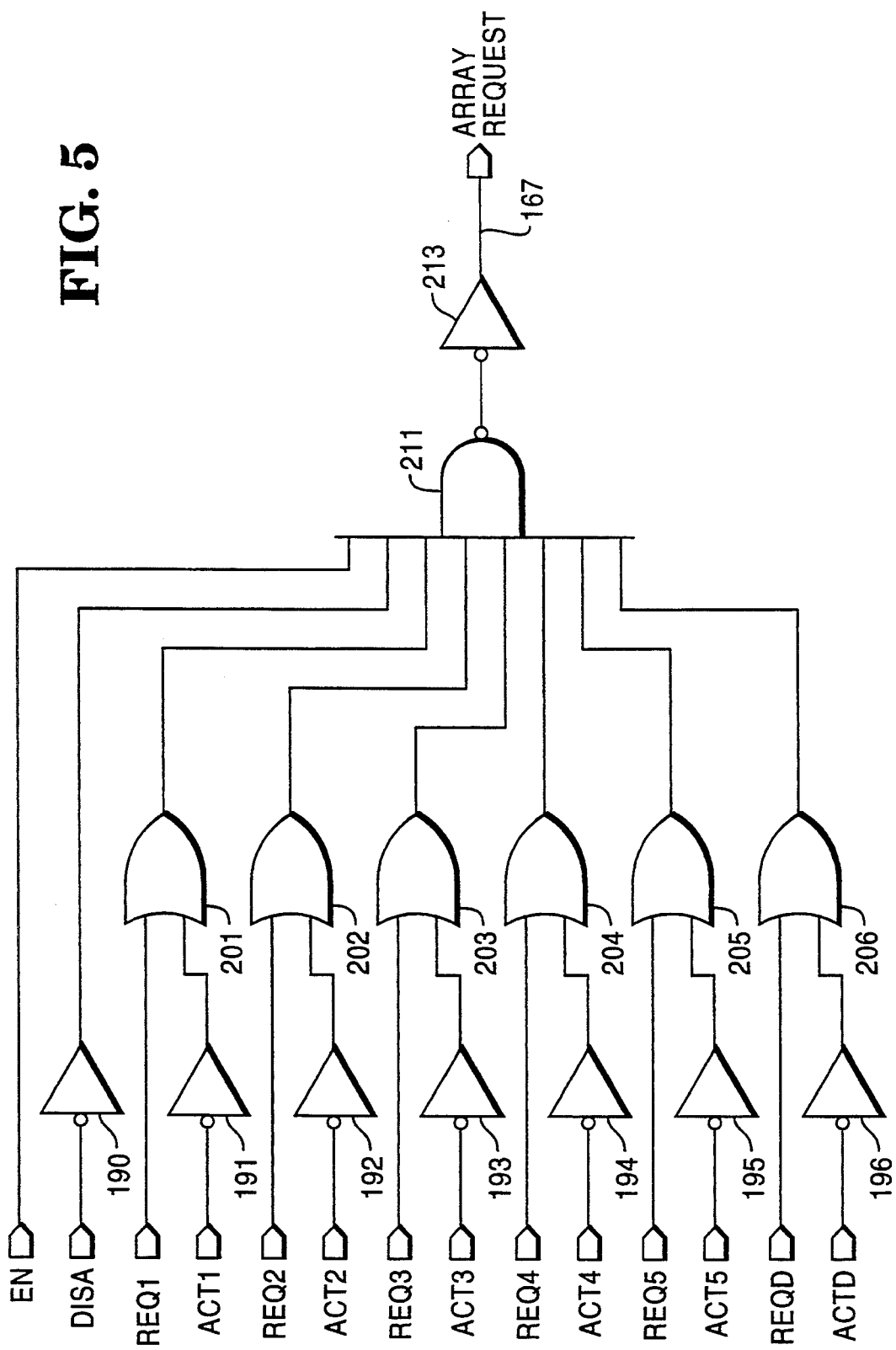
FIG. 5 is a schematic diagram of the circuitry included within the array request lock-step block shown in FIG. 4.

The control block circuitry shown in FIG. 5 includes an inverting buffer 190 connected to receive the active-high signal DISA from configuration check circuit 177; five inverting buffers 191 through 195 associated with array channels one through five and connected to receive signals ACT1 through ACT5, respectively; and an inverting buffer 196 connected to receive a signal ACTD from diagnostic module 181.

Five two-input OR gates 201 through 205 associated with array channels one through five are connected to receive a respective one of signals REQ1 through REQ5 and additionally the output of buffers 191 through 195, respectively. A sixth OR gate 206 is connected to receive as inputs the output of buffer 196 and request signal REQD from diagnostic module 181.

The outputs of buffer 190 and OR gates 201 through 206, together with an enable signal EN provided from enable control register 179, are combined together by a NAND gate 211. The output of gate 211 is provided to an inverting buffer 213 which generates the combined request signal ARRAY REQUEST on line 167.

In operation, each one of OR gates 201 through 205 functions to block passage of the request signal received from its associated array channel and provide a high state signal to gate NAND 211 when the corresponding one of signals ACT1 through ACT5 is in a low state. Signals REQ1 through REQ5 are provided through gates 201 through 205, respectively, without modification whenever the corresponding signals ACT1 through ACT5 are in a high state. OR gate 206 functions to permit or block transmission of diagnostic request signal REQD to NAND gate 211 depending upon the state of signal ACTD.

NAND gate 211 combines the signals received from gates 201 through 206 together with signal EN from enable control register 179, and the output of buffer 190 to generate a low state signal whenever all of the NAND gate input signals are at a high state. Array request signal ARRAY REQUEST is produced by inverting the output of NAND gate 211.

Table 6 which follows lists all array channel signal combinations which produce a high-state ARRAY REQUEST signal.

TABLE 6

| (Signals EN = 1 and DISA = 0, signal REQD = 1 or signal ACTD = 0) | | | | | | | | | |
|---|---|---|---|---|---|---|---|---|---|
| REQ1 | ACT1 | REQ2 | ACT2 | REQ3 | ACT3 | REQ4 | ACT4 | REQ5 | ACT5 |
| 1 | 1 | 1 | 1 | 1 | 1 | 1 | 1 | 1 | 1 |

TABLE 6-continued

| (Signals EN = 1 and DISA = 0, signal REQD = 1 or signal ACTD = 0) | | | | | | | | | |
|---|---|---|---|---|---|---|---|---|---|
| REQ1 | ACT1 | REQ2 | ACT2 | REQ3 | ACT3 | REQ4 | ACT4 | REQ5 | ACT5 |
| X | 0 | 1 | 1 | 1 | 1 | 1 | 1 | 1 | 1 |
| 1 | 1 | X | 0 | 1 | 1 | 1 | 1 | 1 | 1 |
| X | 0 | X | 0 | 1 | 1 | 1 | 1 | 1 | 1 |
| 1 | 1 | 1 | 1 | X | 0 | 1 | 1 | 1 | 1 |
| X | 0 | 1 | 1 | X | 0 | 1 | 1 | 1 | 1 |
| 1 | 1 | X | 0 | X | 0 | 1 | 1 | 1 | 1 |
| X | 0 | X | 0 | X | 0 | 1 | 1 | 1 | 1 |
| 1 | 1 | 1 | 1 | 1 | 1 | X | 0 | 1 | 1 |
| X | 0 | 1 | 1 | 1 | 1 | X | 0 | 1 | 1 |
| 1 | 1 | X | 0 | 1 | 1 | X | 0 | 1 | 1 |
| X | 0 | X | 0 | 1 | 1 | X | 0 | 1 | 1 |
| 1 | 1 | 1 | 1 | X | 0 | X | 0 | 1 | 1 |
| X | 0 | 1 | 1 | X | 0 | X | 0 | 1 | 1 |
| 1 | 1 | X | 0 | X | 0 | X | 0 | 1 | 1 |
| X | 0 | X | 0 | X | 0 | X | 0 | 1 | 1 |
| 1 | 1 | 1 | 1 | 1 | 1 | 1 | 1 | X | 0 |
| X | 0 | 1 | 1 | 1 | 1 | 1 | 1 | X | 0 |
| 1 | 1 | X | 0 | 1 | 1 | 1 | 1 | X | 0 |
| X | 0 | X | 0 | 1 | 1 | 1 | 1 | X | 0 |
| 1 | 1 | 1 | 1 | X | 0 | 1 | 1 | X | 0 |
| X | 0 | 1 | 1 | X | 0 | 1 | 1 | X | 0 |
| 1 | 1 | X | 0 | X | 0 | 1 | 1 | X | 0 |
| X | 0 | X | 0 | X | 0 | 1 | 1 | X | 0 |
| 1 | 1 | 1 | 1 | 1 | 1 | X | 0 | X | 0 |
| X | 0 | 1 | 1 | 1 | 1 | X | 0 | X | 0 |
| 1 | 1 | X | 0 | 1 | 1 | X | 0 | X | 0 |
| X | 0 | X | 0 | 1 | 1 | X | 0 | X | 0 |
| 1 | 1 | 1 | 1 | X | 0 | X | 0 | X | 0 |
| X | 0 | 1 | 1 | X | 0 | X | 0 | X | 0 |
| 1 | 1 | X | 0 | X | 0 | X | 0 | X | 0 |

In table 6 above, a "1" indicates a high logic state signal value, a "0" indicates a low logic state signal value, and an "X" indicates any logic state for the associated signal. The signal combinations shown above produce a high-state ARRAY REQUEST signal when enable signal EN is high, disable signal DISA is low and all enabled REQ signals are active. Signals REQD and ACTD, the outputs of diagnostic module 181, are also not shown in the above table. These two signals would be received and processed by the array request lock-step control logic 165 in the same manner as signals REQ1 through REQ5 and ACT1 through ACT5.

The logic for generating a plurality of individual channel acknowledge signals from a single array acknowledge signal is shown in block diagram form in FIG. 6. The logic shown resembles that shown in FIG. 4, however, array request lock-step control logic block 165 has been replaced with an array acknowledge control logic block 217. Activity register 161, configuration check circuit 177, enable control register 179 and diagnostic module 181, shown in FIG. 4 and discussed above, are also shown in FIG. 6.

Array acknowledge control logic block 217 receives signals ACT1 through ACTN from activity register 161 and an array acknowledge signal ARRAY ACKNOWLEDGE on line 215. Within control block 217 the array acknowledge signal is combined with each one of signals ACT1 through ACTN to generate the individual channel acknowledge signals, identified as ACK1, ACK2, ACK3 through ACKN. Additionally, the array acknowledge signal is combined with diagnostic module signal ACTD to generate an acknowledge signal ACKD for diagnostic module 181.

Figure 7:
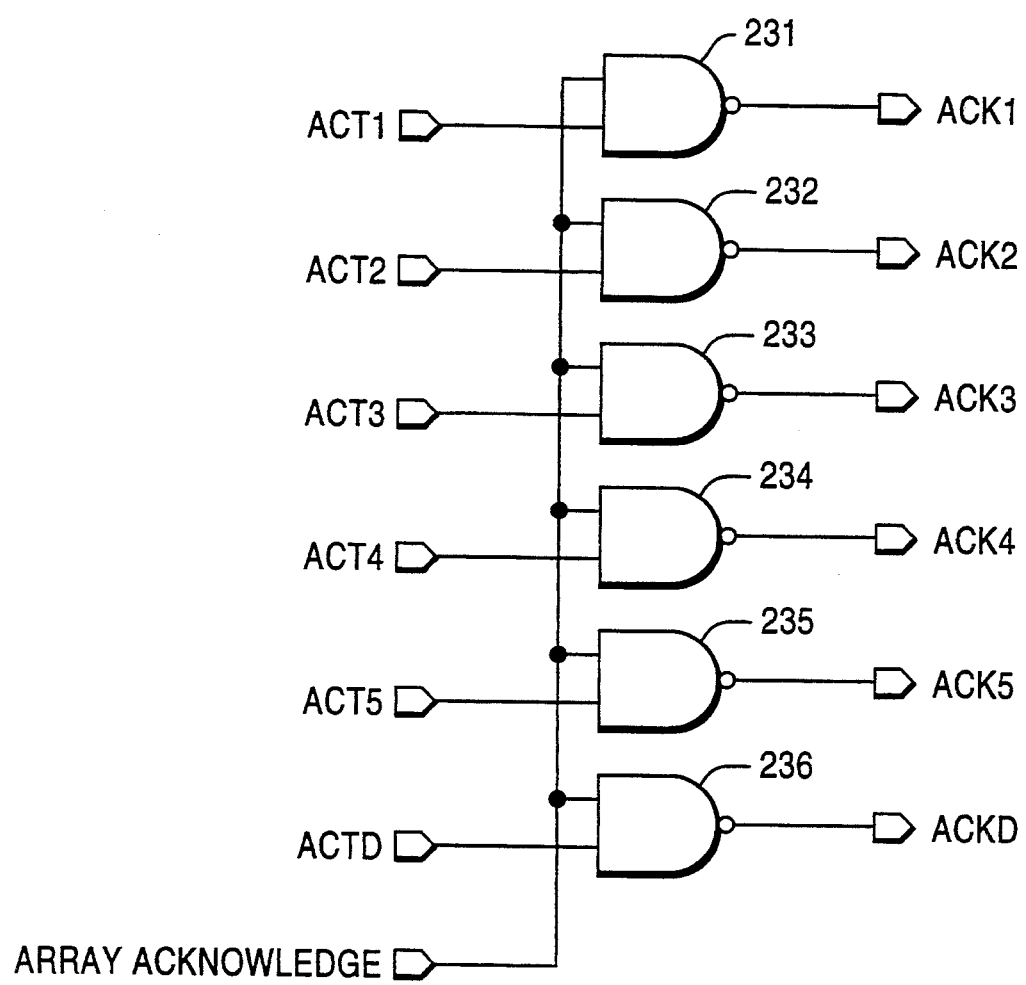
FIG. 7 is a schematic diagram of the circuitry included within the array acknowledge lock-step control block shown in FIG. 6.

A schematic diagram of circuitry included within array request lock-step control block 165 for generating five individual channel acknowledge signals, ACK1 through ACK5, is provided in FIG. 7. The circuitry shown in FIG. 7 consists of six two-input AND NAND gates 231 through 236. Each gate has one input connected to receive the array acknowledge signal, and a second input connected to receive a corresponding one of signals ACT1 through ACT5 from activity register 161 and signal ACTD from diagnostic module 181.

The operation of the logic shown in FIGS. 5 and 7 should be readily apparent to one skilled in the art. Each one of NAND gates 231 through 236 functions to block passage of the acknowledge signal received from the host to the corresponding array channel or diagnostic module 181.

It can thus be seen that there has been provided by the present invention a disk array controller capable of operating all or a subset of all the drives within a disk array as a single logical unit. The controller includes logic for combining and qualifying a plurality of array channel requests to generate a single synchronous response to the host controller, allowing the several drives within the logical unit to operate their spindles at the same synchronous rotational rate. Those skilled in the art will recognize that the invention is not limited to the specific embodiments described above and that numerous modifications and changes are possible without departing from the scope of the present invention. For example, in the embodiment described above active channels are identified with a logic one stored in a corresponding bit position within activity register 161. A logic zero could be utilized to identify active channels thus eliminating the need for inverting buffers 191 through 205 in the circuit shown in FIG. 5.

In the described embodiment the array includes five drive channels. However, the array and controller architecture, and request and acknowledge logic need not be limited to five channels. In addition, the architecture presented above shows a single drive associated with each drive channel, i.e. the drives form a single rank of drives. The present invention can readily be applied to multiple rank arrays wherein each channel provides access to two or more disk drives.

Although the presently preferred embodiment of the invention has been described, it will be understood that various changes may be made within the scope of the appended claims.

What is claimed is:

1. Apparatus for generating a request signal for a logical storage unit comprising one or more disk drive channels within a disk array, the apparatus comprising:
   a register for storing a bit pattern which identifies disk drives included within said logical storage unit; and
   logic connected to receive the bit pattern stored within said register and individual request signals from each disk drive within said disk array for combining the individual request signals associated with the disk drives included within said logical storage unit to generate the request signal for said logical unit.

2. The apparatus according to claim 1, wherein said logic for combining the individual request signals includes an AND logic operator for combining the individual request signals associated with the disk drives included within said logical storage unit to generate the request signal for said logical unit.

3. The apparatus according to claim 1, further comprising logic connected to receive the bit pattern stored within said register and an acknowledge signal for said logical storage unit for generating individual disk drive acknowledge signals for the disk drives included within said logical storage unit.

4. The apparatus according to claim 1, wherein:
   said bit pattern includes a bit corresponding to each disk drive within said disk array; and
   each bit within said bit pattern is set to a first binary value to identify its corresponding disk drive as included within said logical storage unit, and set to a second bit pattern to identify its corresponding disk drive as not included within said logical storage unit.

5. The apparatus according to claim 4, wherein:
   said first logic value is a logic one value and said second logic value is a logic zero value; and
   said logic for combining the individual request signals comprises:
      an OR gate associated with each disk drive within said disk array, said OR gate having a first inverting input connected to receive the bit corresponding to its associated disk drive from said register, and a second input for receiving the individual request signal from its associated disk drive; and
      an AND logic operator connected to receive the outputs of said OR gates for combining the OR gate outputs to generate the request signal for said logical unit.

6. The apparatus according to claim 5, further comprising a NAND gate associated with each disk drive within said disk array, said NAND gate having a first input connected to receive the bit corresponding to its associated disk drive from said register, and a second input for receiving an acknowledge signal for said logical storage unit, the output of said NAND gate providing an individual acknowledge signal for its associated disk drive.

7. Apparatus for generating a request signal for a logical storage unit comprising one or more disk drives within a disk array, each disk drive having associated therewith a disk drive request signal and a select signal, said select signal having a first binary state when its associated disk drive is included within said logical storage unit, and a second binary state when its associated disk drive is not included within said logical storage unit, the apparatus comprising:
   logic connected to receive the disk drive request signals and select signals from each disk drive within said disk array for combining the individual request signals whose associated select signals are set to said first binary value to generate the request signal for said logical unit.

8. The apparatus according to claim 7, wherein said logic comprises:
   switch means associated with each disk drive within said disk array, said switch means having inputs connected to receive the disk drive request and select signals for its associated disk drive and an output, said switch means being responsive to the received select signal to provide the received disk drive request signal at its output when said received select signal is set to said first binary state; and
   an AND gate connected to receive the outputs of each of said switch means for combining said outputs to generate the request signal for said logical unit.

9. Apparatus for synchronizing the operation of a plurality of disk drives within a disk array, each disk drive including means for generating a request handshake signal and means for receiving an acknowledge handshake signal, comprising:
   logic connected to receive the individual request signals from said plurality of disk drives for combining the individual request signals to generate a single array request signal.

10. The apparatus according to claim 9, further comprising:
    logic for receiving an acknowledge signal generated in response to said array request signal and synchronously providing said acknowledge signal to each one of said plurality of disk drives.

11. In a data processing system including an array of disk drives, each disk drive including means for generating a request handshake signal and means for receiving an acknowledge handshake signal, a method for effecting disk array read and write operations without the use of a data buffer, said method comprising the steps of:
    combining the individual request signals generated by said array of disk drives to generate a single array request signal which is provided to said data processing system; and
    synchronously providing an acknowledge signal received from said data processing system in response to said array request signal to each one of said plurality of disk drives;
    whereby said disk drives within said disk array operate in a synchronous manner in response to the receipt of said acknowledge signal.

12. A method for generating a request signal for a logical storage unit comprising one or more disk drives within a disk array, each disk drive within said array generating a disk drive request signal, the method comprising the steps of:
    generating a select signal for each disk drive included within said array, whereby each disk drive has associated therewith a select signal and a disk drive request signal, said select signal having a first binary value when its associated disk drive is included within said logical storage unit, and a second binary value when its associated disk drive is not included within said logical storage unit;

selecting disk drive request signals whose associated select signals are set to said first binary value to form a group of disk drive request signals; and combining the selected disk drive request signals within said group to generate the request signal for said logical storage unit, said selected disk drive request signals being combined in an AND operation.

* * * * *